United States Patent
Shi et al.

(10) Patent No.: US 11,709,228 B2
(45) Date of Patent: Jul. 25, 2023

(54) LASER POSITIONING APPARATUS AND LASER POSITIONING METHOD

(71) Applicant: NORTHWEST INSTRUMENT INC., Budd Lake, NJ (US)

(72) Inventors: Xin Shi, Shanghai (CN); David Xing, Budd Lake, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 541 days.

(21) Appl. No.: 16/314,892

(22) PCT Filed: Jul. 12, 2017

(86) PCT No.: PCT/CN2017/092604
§ 371 (c)(1),
(2) Date: Jan. 3, 2019

(87) PCT Pub. No.: WO2018/153008
PCT Pub. Date: Aug. 30, 2018

(65) Prior Publication Data
US 2019/0369214 A1    Dec. 5, 2019

(30) Foreign Application Priority Data
Feb. 24, 2017 (CN) .......................... 201710102687.3

(51) Int. Cl.
*G01S 7/481* (2006.01)
*G01S 17/08* (2006.01)

(52) U.S. Cl.
CPC ............ *G01S 7/4814* (2013.01); *G01S 17/08* (2013.01)

(58) Field of Classification Search
CPC ...... G01S 7/4811; G01S 7/4814; G01S 17/06; G01S 17/08; G02B 2006/1215
See application file for complete search history.

(56) References Cited

U.S. PATENT DOCUMENTS

| 4,687,332 A | 8/1987 | Bareket |
| 5,489,984 A * | 2/1996 | Hariharan .................. G01L 3/12 356/4.09 |

(Continued)

FOREIGN PATENT DOCUMENTS

| CN | 201184788 Y | 1/2009 |
| CN | 202794521 U * | 3/2013 |

(Continued)

OTHER PUBLICATIONS

Interational Search Report and Written Opinion for Application No. PCT/CN2017/092604, dated Nov. 24, 2017.

*Primary Examiner* — Yuqing Xiao
*Assistant Examiner* — Benjamin Richard Hebert
(74) *Attorney, Agent, or Firm* — Anova Law Group, PLLC

(57) ABSTRACT

The present invention relates to a laser positioning apparatus and a laser positioning method, the laser positioning apparatus comprises a laser emitting module configured to generate a first laser; a laser direction adjusting module configured to adjust the first laser to a second laser in a first direction and a third laser in a second direction perpendicular to the first direction; a distance determining module configured to receive the laser reflected or diffused back by the second laser on a surface of a first object to be measured to determine a distance from the laser positioning apparatus to the first object to be measured, and/or receive the laser reflected or diffused back by the third laser on a surface of a second object to be measured to determine a distance from the laser positioning apparatus to the second object to be measured.

18 Claims, 2 Drawing Sheets

(56) References Cited

U.S. PATENT DOCUMENTS

| | | | | |
|---|---|---|---|---|
| 5,955,854 A | * | 9/1999 | Zhang | E05F 15/431 340/901 |
| 6,166,817 A | | 12/2000 | Kuroda | |
| 2004/0051860 A1 | * | 3/2004 | Honda | G01S 7/4808 356/4.01 |
| 2013/0135604 A1 | * | 5/2013 | Gogolla | G01C 3/08 356/4.01 |
| 2014/0071433 A1 | * | 3/2014 | Eisele | G01S 7/4914 356/5.01 |
| 2015/0323669 A1 | * | 11/2015 | Lee | G01S 7/4813 356/3.11 |
| 2016/0170024 A1 | * | 6/2016 | Bockem | G01S 17/87 356/5.09 |
| 2016/0274239 A1 | * | 9/2016 | Gupta | G01C 3/08 |
| 2018/0106901 A1 | * | 4/2018 | Frederiksen | G01S 7/4816 |

FOREIGN PATENT DOCUMENTS

| | | |
|---|---|---|
| CN | 103075963 A | 5/2013 |
| CN | 205280929 U | 6/2016 |
| CN | 106886027 A | 6/2017 |

\* cited by examiner

LASER POSITIONING APPARATUS AND LASER POSITIONING METHOD

FIELD OF THE DISCLOSURE

The present invention relates to the field of distance measurement, and more particularly to a laser positioning apparatus and a laser positioning method.

BACKGROUND

Although a variety of laser positioning apparatus are known in the prior art, the known laser positioning apparatus can either only reuse the same laser positioning apparatus at different times to measure distances in different directions or only use two independent laser positioning apparatus to measure distances in two respective different directions as performing distance measurement in different directions.

For example, Chinese Patent No. CN103075963B provides an indoor positioning system including a controller, a driving means and a rotating mechanism which are sequentially connected, and a first laser rangefinder and a second laser rangefinder respectively connected to the controller; the first laser rangefinder and the second laser rangefinder are fixedly mounted to the rotating mechanism, and the light emitted by the first laser rangefinder is perpendicular to the light emitted by the second laser rangefinder. The invention also provides an indoor positioning method. With employing the technical solution of the invention, two perpendicular laser rangefinders can be used for positioning, which makes the positioning precision high, and the distance relationship between the two laser rangefinders and the reference edge can be used to calibrate the directions of the lights emitted by the laser rangefinders, which may implement the calibration of the positioning system using a simple structure and have the novel concept.

However, from reading through this patent, it is not difficult to find that in this indoor positioning system, measuring distances in different directions is implemented by employing independent laser positioning apparatus.

SUMMARY

In view of the above technical problem, there is a technical problem in the prior art that distances in two directions cannot be measured by a single laser positioning apparatus without rotating the laser positioning apparatus, and a laser positioning apparatus is provided according to the present invention, the laser positioning apparatus comprises:

a laser emitting module configured to generate a first laser;

a laser direction adjusting module configured to adjust the first laser to a second laser in a first direction and a third laser in a second direction perpendicular to the first direction;

a distance determining module configured to receive the laser reflected or diffused back by the second laser on a surface of a first object to be measured to determine a distance from the laser positioning apparatus to the first object to be measured, and/or receive the laser reflected or diffused back by the third laser on a surface of a second object to be measured to determine a distance from the laser positioning apparatus to the second object to be measured.

By means of the laser positioning apparatus according to the present invention, the distances in two directions can be measured using only one laser emitting module, thereby simplifying the structure of the laser positioning apparatus and reducing the manufacturing cost.

In one embodiment according to the present invention, the laser direction adjusting module is configured as a beam splitter mirror. In such an implementation, the laser direction adjusting module according to the present invention may be implemented conveniently and inexpensively, and then the first laser is adjusted to the second laser in the first direction and the third laser in the second direction perpendicular to the first direction.

In an embodiment according to the present invention, the beam splitter mirror comprises a transflective optical element. It will be understood by those skilled in the art that the transflective optical element mentioned herein are merely exemplary and not limiting, and other optical elements being capable of achieving the same or similar functions are also included in the scope of the present invention.

In one embodiment according to the present invention, the distance determining module comprises:

a first receiving objective lens configured to receive and process the laser reflected or diffused back by the second laser on the surface of the first object to be measured; and a first receiver configured to receive the laser processed by the first receiving objective lens.

In such an implementation, the laser positioning apparatus is capable of receiving the laser reflected or diffused back from a front object in a first direction and performing optical processing such as focusing on it, and then the laser receiver is capable of receiving the light such as the focused light, then sequentially determining a distance from the front object to the laser positioning apparatus in the first direction to implement the positioning function based on the distance.

In one embodiment according to the present invention, the distance determining module further comprises:

a second receiving objective lens configured to receive and process the laser reflected or diffused back by the third laser on the surface of the second object to be measured; and a second receiver configured to receive the laser processed by the second receiving objective lens.

In such an implementation, the laser positioning apparatus is capable of receiving the laser reflected or diffused back from the front object in the first and/or second directions and performing optical processing such as focusing on it, and then the laser receiver is capable of receiving the light such as the focused light, then sequentially determining the distance from the front object to the laser positioning apparatus in the first and/or second directions to implement the positioning function based on the distance.

In one embodiment according to the present invention, the laser positioning apparatus further comprises:

a display module configured to display a distance from the laser positioning apparatus to the first object to be measured and/or a distance from the laser positioning apparatus to the second object to be measured.

When the laser positioning apparatus according to the present invention has the above-mentioned display module, the laser positioning apparatus may display the measured distance more visually, be convenient to use, and simultaneously display the distance from the laser positioning apparatus to the first object to be measured and/or a distance from the laser positioning apparatus to the second object to be measured.

In one embodiment according to the present invention, the display module further comprises a prompting module configured to issue a prompt when the distance from the laser positioning apparatus to the first object to be measured satisfies a predetermined requirement, and/or the distance from the laser positioning apparatus to the second object to be measured satisfies the predetermined requirement.

In such an implementation, the laser positioning apparatus according to the present invention is capable of prompting the user of the distance from the target object and whether a predetermined positioning point has been reached.

In one embodiment of the present invention, the laser positioning apparatus further comprises a direction indicating module configured to determine a position relationship between the second laser and the first object to be measured, and/or determining a position relationship between the third laser and the second object to be measured.

In one embodiment in accordance with the present invention, the laser positioning apparatus further comprises a direction adjusting module configured to adjust the laser positioning apparatus according to the position relationship determined by the direction indicating module such that the second laser is perpendicular to the surface of the first object to be measured and/or the third laser is perpendicular to the surface of the second object to be measured.

At this time, the laser positioning apparatus according to the present invention is capable of adjusting its own posture so that the distance may be measured relatively perpendicularly to the reference object, thereby enabling more accurate positioning.

In one embodiment according to the present invention, the laser positioning apparatus further comprises a control module configured to control the laser positioning apparatus based on the position relationship between the second laser and the first object to be measured and/or the position relationship between the third laser and the second object to be measured.

In one embodiment according to the present invention, the laser positioning apparatus further comprises a communicating module configured to receive positioning information and/or output the measured position information. In such an implementation, the laser positioning apparatus according to the present invention can be more intelligently connected to an external device, thereby implementing an intelligent positioning function.

Further, a second aspect of the present invention provides a laser positioning method, wherein the laser positioning method comprises:

adjusting a first laser generated by a laser emitter to a second laser and a third laser by using a beam splitter mirror, wherein the second laser and the third laser are perpendicular to each other;

positioning the laser positioning apparatus with the second laser and the third laser.

By means of the laser positioning method according to the present invention, the distances in two directions can be measured using only one laser emitting module, thereby simplifying the structure of the laser positioning apparatus and reducing the manufacturing cost.

In one embodiment according to the present invention, the laser positioning method further comprises:

receiving position information to be positioned; and positioning a laser positioning apparatus with the second laser and the third laser according to the position information.

In one embodiment according to the present invention, the laser positioning method further comprises:

receiving the laser reflected or diffused back by the second laser on a surface of a first object to be measured to determine a distance from the laser positioning apparatus to the first object to be measured; and receiving the laser reflected or diffused back by the third laser on a surface of a second object to be measured to determine a distance from the laser positioning apparatus to the second object to be measured.

By means of the laser positioning apparatus and the laser positioning method according to the present invention, the distances in both directions can be measured using only one laser emitting module, thereby simplifying the structure of the laser positioning apparatus and reducing the manufacturing cost.

BRIEF DESCRIPTION OF THE DRAWINGS

Embodiments are illustrated and described with reference to the figures. These figures are used to clarify the basic principles and thus only illustrate the aspects necessary to understand the basic principles. These figures are not to scale. In the figures, the same reference numbers indicate similar features.

Other features, aspects, advantages and benefits of the present invention will become more apparent in conjunction with the detailed description of the appended claims.

DETAILED DESCRIPTION

In the following detailed description of the preferred embodiments, reference will be made to the accompanying figures which are parts of the present invention. The accompanying figures illustrate, by way of example, specific embodiments that can implement the present invention. The exemplary embodiments are not intended to be exhaustive of all embodiments according to the present invention. It may be appreciated that other embodiments may be utilized and structural or logical modifications may be made without departing from the scope of the present invention. Therefore, the following detailed description is not to be limited but to be defined by the appended claims.

Figure 1:
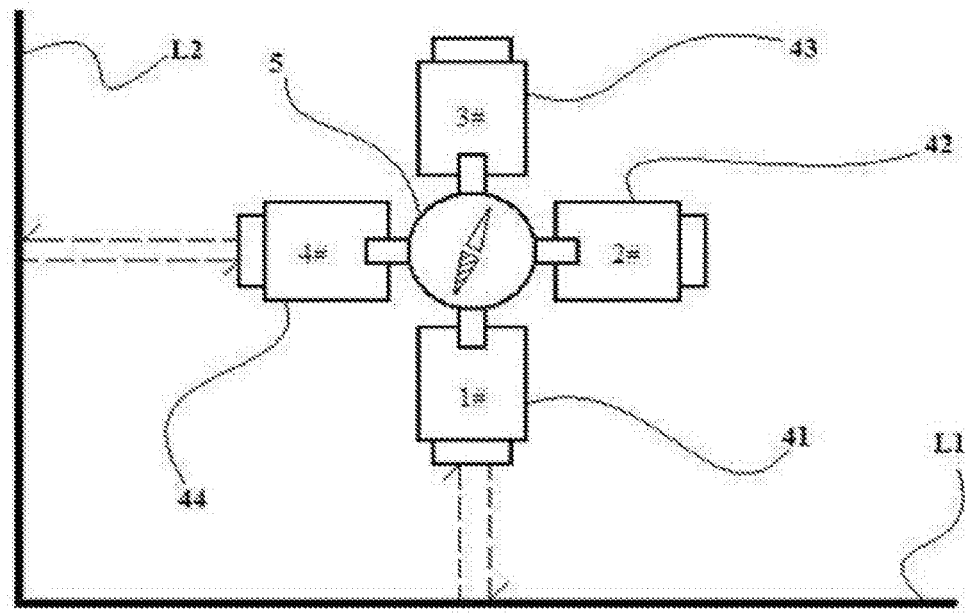
FIG. 1 illustrates a schematic view of a laser positioning apparatus in the prior art.

FIG. 1 illustrates a schematic view of a laser positioning apparatus in the prior art. As can be seen from the figure, the indoor positioning system includes a controller 1, a driving means 2, a rotating mechanism 3 which are sequentially connected, a first laser rangefinder 41 and a second laser rangefinder 42 respectively connected to the controller 1; the first laser rangefinder 41 and the second laser rangefinder 42 are fixedly mounted to the rotating mechanism 3, and the light emitted by the first laser rangefinder 41 is perpendicular to the light emitted by the second laser rangefinder 42. That is, the indoor positioning system according to the prior art employs independent first laser rangefinder 41 and second laser rangefinder 42 to measure the distances in two directions respectively.

Figure 2:
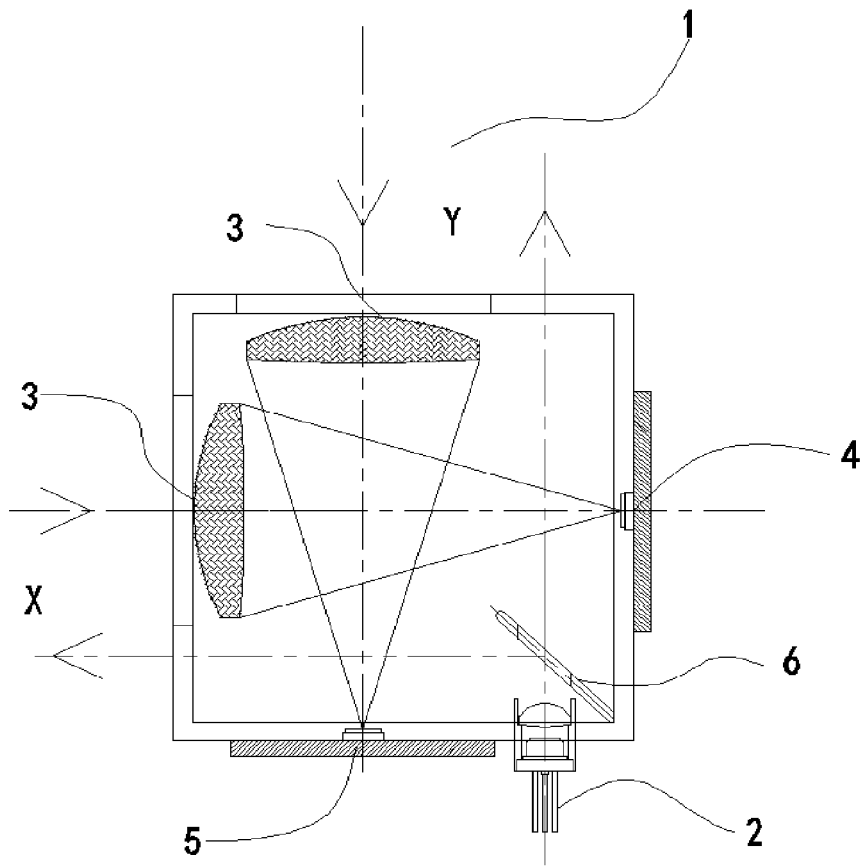
FIG. 2 is a schematic view of the laser positioning apparatus according to the present invention.

In contrast, the laser positioning apparatus according to the present invention can implement the measurement of the distances in two directions with a same laser rangefinder, i.e., the laser positioning module mentioned in the present invention may implement the measurement of the distances in two directions, and further implement the positioning functions in two dimensions. FIG. 2 is a schematic view of the laser positioning apparatus according to the present invention, as can be seen from the figures, the laser positioning apparatus 1 according to the present invention includes a laser emitting module 2 configured to generate a first laser;

a laser direction adjusting module 6 configured to adjust the first laser to a second laser in a direction X and adjust the first laser to a third laser in a direction Y perpendicular to the direction X;

the distance determining modules (including 3 and 4) are configured to receive the laser reflected or diffused back by the second laser on a surface of a first object to be measured to determine a distance from the laser positioning apparatus to the first object to be measured; and the distance determining modules (including 3 and 5) are configured to receive the laser reflected or diffused back by the third laser on a surface of a second object to be measured to determine a distance from the laser positioning apparatus to the second object to be measured.

By means of the laser positioning apparatus according to the present invention, the distances in two directions X and Y can be measured using only one laser emitting module 2, thereby simplifying the structure of the laser positioning apparatus 1 and reducing the manufacturing cost.

In one embodiment according to the present invention, the laser direction adjusting module 6 is configured as a beam splitter mirror. In such an implementation, the laser direction adjusting module provided according to the present invention may be implemented conveniently and inexpensively, and then the first laser may be adjusted to the second laser in the first direction or the third laser in the second direction perpendicular to the first direction.

In one embodiment according to the present invention, the beam splitter mirror 6 comprises a transflective optical element. It will be understood by those skilled in the art that the transflective optical element mentioned herein are merely exemplary and not limiting, and other optical elements being capable of achieving the same or similar functions are also included in the scope of the present invention.

In one embodiment according to the present invention, the distance determining module comprises:

a first receiving objective lens 3 configured to receive and process the laser reflected or diffused back by the second laser on the surface of the first object to be measured; and a first receiver 4 configured to receive the laser processed by the first receiving objective lens.

In such an implementation, the laser positioning apparatus 1 is capable of receiving the laser reflected or diffused back from a front object in the first direction and performing optical processing such as focusing on it, and then the laser receiver is capable of receiving the light such as the focused light, and then sequentially determining a distance from the front object to the laser positioning apparatus in the first direction to implement the positioning function based on the distance.

In one embodiment according to the present invention, the distance determining module further comprises:

a second receiving objective lens 3 configured to receive and process the laser reflected or diffused back by the third laser on the surface of the second object to be measured; and a second receiver 5 configured to receive the laser processed by the second receiving objective lens.

In such an implementation, the laser positioning apparatus is capable of receiving the laser reflected or diffused back from the front object in the first and/or second directions and performing optical processing such as focusing on it, and then the laser receiver is capable of receiving the light such as the focused light, and then sequentially determining the distance from the front object to the laser positioning apparatus in the first and/or second directions to implement the positioning function based on the distance.

In one embodiment of the present invention, the laser positioning apparatus 1 further comprises:

a display module (not shown) configured to display a distance from the laser positioning apparatus to the first object to be measured and/or a distance from the laser positioning apparatus to the second object to be measured.

When the laser positioning apparatus according to the present invention has the above-mentioned display module, the laser positioning apparatus may display the measured distance more visually, be convenient to use, and simultaneously display the distance from the laser positioning apparatus to the first object to be measured and/or the distance from the laser positioning apparatus to the second object to be measured.

In one embodiment according to the present invention, the display module further comprises a prompting module configured to issue a prompt when the distance from the laser positioning apparatus to the first object to be measured satisfies a predetermined requirement and/or when the distance from the laser positioning apparatus to the second object to be measured satisfies the predetermined requirement.

In such an implementation, the laser positioning apparatus according to the present invention is capable of prompting the user of the distance from the target object and whether a predetermined positioning point has been reached.

In one embodiment of the present invention, the laser positioning apparatus 1 further comprises a direction indicating module configured to determine a position relationship between the second laser and the first object to be measured and/or determining a position relationship between the third laser and the second object to be measured.

In one embodiment according to the present invention, the laser positioning apparatus 1 further comprises a direction adjusting module configured to adjust the laser positioning apparatus according to a position relationship determined by the direction indicating module, such that the second laser is perpendicular to a surface of the first object to be measured and/or the third laser is perpendicular to a surface of the second object to be measured.

At this time, the laser positioning apparatus according to the present invention is capable of adjusting its own posture so that the distance may be measured relatively perpendicularly to the reference object, thereby enabling more accurate positioning.

In one embodiment according to the present invention, the laser positioning apparatus further comprises a control module configured to control the laser positioning apparatus based on the position relationship between the second laser and the first object to be measured and/or the position relationship between the third laser and the second object to be measured.

In one embodiment according to the present invention, the laser positioning apparatus further comprises a communicating module configured to receive positioning information and/or output the measured position information. In such an implementation, the laser positioning apparatus according to the present invention may be more intelligently connected to an external device, thereby implementing an intelligent positioning function.

Figure 3:
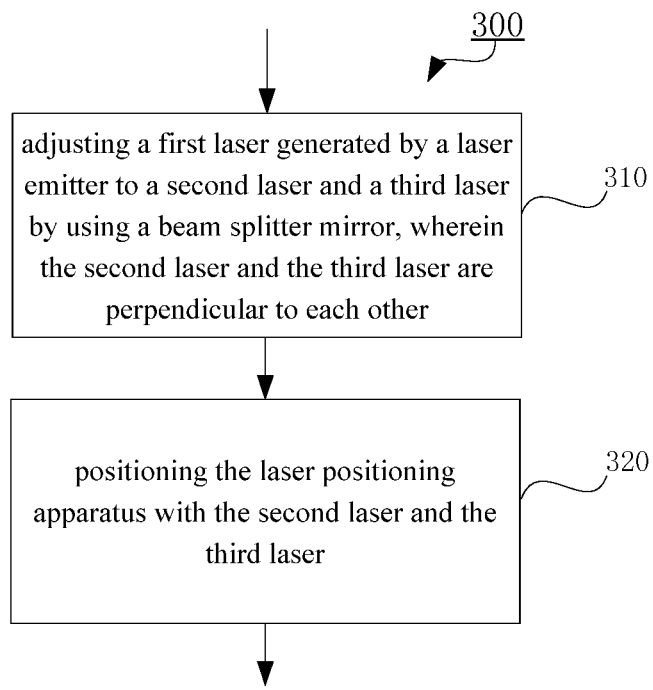
FIG. 3 illustrates a flowchart 300 of a laser positioning method according to the present invention.

Further, a second aspect of the present invention provides a laser positioning method, and FIG. 3 illustrates a flowchart 300 of a laser positioning method according to the present invention. As can be seen from the figure, the laser positioning method comprises the following steps:

First, in a first step 310, adjusting a first laser generated by a laser emitter to a second laser and a third laser by using a beam splitter mirror, wherein the second laser and the third laser are perpendicular to each other; and Then, in a second step 320, positioning the laser positioning apparatus with the second and third lasers.

By means of the laser positioning method according to the present invention, the distances in two directions can be measured using only one laser emitting module 2, thereby simplifying the structure of the laser positioning apparatus 1 and reducing the manufacturing cost.

In one embodiment of the present invention, the laser positioning method further comprises:

receiving position information to be positioned; and positioning the laser positioning apparatus with the second laser and the third laser according to the position information.

In one embodiment of the present invention, the laser positioning method further comprises:

receiving the laser reflected or diffused back by the second laser on a surface of a first object to be measured to determine a distance from the laser positioning apparatus to a first object to be measured; and receiving the laser reflected or diffused back by the third laser on a surface of a second object to be measured to determine a distance from the laser positioning apparatus to the second object to be measured.

Figure 4:
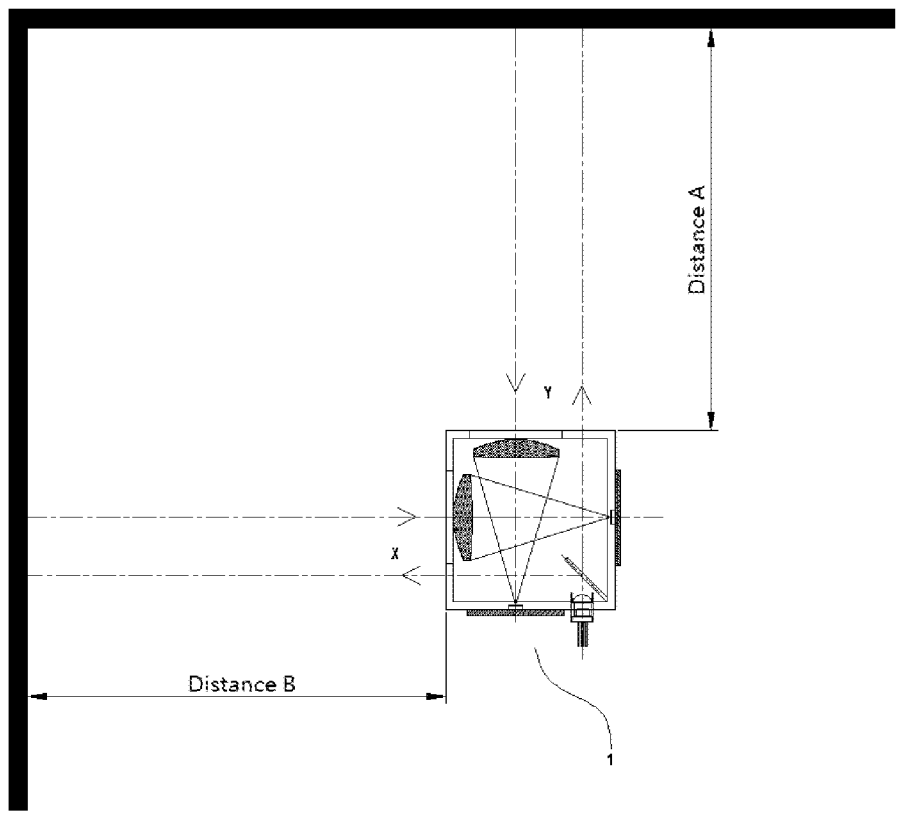
FIG. 4 illustrates a schematic view 400 of a laser positioning apparatus in use according to the present invention.

FIG. 4 illustrates a schematic view 400 of a laser positioning apparatus in use according to the present invention. As can be seen from the figure, the laser emitted by the laser emitting module 2 passes through the laser direction adjusting module 6, and the first laser is adjusted to a second laser in the first direction X and a third laser in the second direction Y perpendicular to first direction X, thereafter, the two laser beams are respectively irradiated to the target object, for example, reflected back on the wall surface, and the laser positioning apparatus can measure the distance A and the distance B by analyzing the reflected light, thereby being used for positioning. As previously mentioned, the laser positioning apparatus can, for example, comprise a communication module by which a target point to be positioned can be received from other devices, and then the laser positioning apparatus compares the current positioning point with the target point for giving an operation instruction for operator to position easily.

By means of the laser positioning apparatus and the laser positioning method according to the present invention, the distances in both directions can be measured using only one laser emitting module, thereby simplifying the structure of the laser positioning apparatus and reducing the manufacturing cost.

The laser positioning apparatus referred to in the present disclosure is capable of measuring the distance in the first direction as well as measuring the distance in the second direction perpendicular to the first direction without rotating the laser positioning apparatus. After obtaining the distance between the two mutually perpendicular directions, the current location of the laser positioning apparatus can be positioned, e.g., to give a two-dimensional coordinate of the current position of the laser positioning apparatus.

It should be appreciated by those skilled in the art that various changes and modifications may be made without departing from the spirit of the present invention. Therefore, the scope of the present invention should be defined by the appended claims.

While various exemplary embodiments of the present invention have been described, it will be apparent to those skilled in the art that various changes and modifications can be made which can implement some of the advantages of the present invention without departing from the spirit and scope of the present invention. Other components performing the same functions may be appropriately replaced for those skilled in the art. It should be mentioned that features explained herein with reference to particular figures may be combined with features of other figures, even in those cases where this is not explicitly mentioned. Moreover, the method of the present invention can be implemented in either a software implementation using appropriate processor instructions or in a hybrid implementation that utilizes a combination of hardware logic and software logic to achieve the same results. Such modifications to the solution of the present invention are intended to be covered by the appended claims.

What is claimed is:

1. A laser positioning apparatus, comprising:
    a laser emitting module configured to generate a first laser;
    a laser direction adjusting module configured to adjust the first laser to form a second laser in a first direction and to form a third laser in a second direction perpendicular to the first direction, wherein the laser direction adjusting module includes a beam splitter mirror;
    a first receiving objective lens configured to process a laser returned from a first object upon receipt of the second laser by the first object, and a first receiver configured to receive the laser processed by the first receiving objective lens; and
    a second receiving objective lens configured to process a laser returned from a second object upon receipt of the third laser by the second object, and a second receiver configured to receive the laser processed by the second receiving objective lens,
    wherein the first receiver is positioned closer to the beam splitter mirror of the laser direction adjusting module than the first receiving objective lens along the first direction, and
    wherein the second receiver is positioned closer to the beam splitter mirror of the laser direction adjusting module than the second receiving objective lens along the second direction.

2. The laser positioning apparatus according to claim 1, wherein the beam splitter mirror includes a transflective optical element.

3. The laser positioning apparatus according to claim 1, further comprising:
    a display module configured to display a distance from the laser positioning apparatus to the first object and/or a distance from the laser positioning apparatus to the second object.

4. The laser positioning apparatus according to claim 3, wherein the display module further comprises a prompting module configured to issue a prompt when the distance from the laser positioning apparatus to the first object satisfies a predetermined requirement, and/or the distance from the laser positioning apparatus to the second object satisfies the predetermined requirement.

5. The laser positioning apparatus according to claim 3, wherein the display module is configured to simultaneously display the distance from the laser positioning apparatus to the first object and the distance from the laser positioning apparatus to the second object.

6. The laser positioning apparatus according to claim 1, further comprising:
a direction indicating module configured to determine a position relationship between the second laser and the first object, and/or determine a position relationship between the third laser and the second object.

7. The laser positioning apparatus according to claim 6, wherein the first laser is adjusted according to the position relationship determined by the direction indicating module.

8. The laser positioning apparatus according to claim 1, further comprising:
a control module configured to control the laser positioning apparatus.

9. The laser positioning apparatus of claim 1, further comprising:
a communicating module configured to receive positioning information and/or output the position information.

10. The laser positioning apparatus according to claim 1, wherein the laser direction adjusting module includes two ends defining therebetween an elongated body, and one of the two ends contacts a housing of the laser positioning apparatus.

11. The laser positioning apparatus according to claim 1, wherein the first laser is spaced apart from the first receiving objective lens along the second direction or the second laser is spaced apart from the second receiving objective lens along the first direction.

12. The laser positioning apparatus according to claim 1, wherein both the first receiving objective lens and the second receiving objective lens are positioned within a housing of the laser positioning apparatus, and the laser emitting module contacts the housing of the laser positioning apparatus.

13. The laser positioning apparatus according to claim 12, wherein a first portion of laser emitting module is positioned inside of the housing of the laser positioning apparatus, and a second portion of the laser emitting module is positioned outside of the housing of the laser positioning apparatus.

14. The laser positioning apparatus according to claim 1, wherein the first receiving objective lens is positioned between the second receiving objective lens and the laser emitting module along the second direction or the second receiving objective lens is positioned between the first receiving objective lens and the laser emitting module along the first direction.

15. The laser positioning apparatus according to claim 1, wherein the laser emitting module is the only laser emitting module comprised in the laser positioning apparatus.

16. The laser positioning apparatus according to claim 1, wherein the second laser travels to the first object without touching the first receiving objective lens, and the third laser travels to the second object without touching the second receiving objective lens.

17. A laser positioning method, comprising:
performing distance measurement using a laser positioning apparatus of claim 1.

18. The laser positioning method according to claim 17, further comprising:
receiving position information; and
positioning the laser positioning apparatus with the second laser and the third laser according to the position information.

* * * * *